Sept. 24, 1935.  F. A. BRODHEAD  2,015,376
FASTENER DEVICE
Filed March 5, 1935

Inventor
F. A. Brodhead
By Robb & Robb
Attorneys

Patented Sept. 24, 1935

2,015,376

UNITED STATES PATENT OFFICE 2,015,376

FASTENER DEVICE

Frank A. Brodhead, Atlantic City, N. J.

Application March 5, 1935, Serial No. 9,484

7 Claims. (Cl. 24—209)

The present invention relates to improvements in separable fastener devices and in particular to a device for fastening or hanging awnings in position upon a support.

The primary object of the invention is to provide a simple article of manufacture to take the place of the usual awning hooks or screw eyes which are more or less unsatisfactory because of the ease with which the awnings become unhooked or the difficulties when using screw eyes of making the necessary connection with the awning eyelets. The present article is designed to be provided with a latch member or head so constructed and arranged as to readily slip through grommets or rings of an awning and automatically gravitate into latching position to retain the awnings against accidental displacement under ordinary conditions from the fasteners.

A further object in view is to provide a fastener device of this character with positive means whereby the swinging head thereof is prevented from accidentally slipping into such a position as to release the awning, said locking means being in the form of a ring or loop shaped detent pivotally connected to the latch itself in such a manner as to fall into locking position when released after insertion of the fastener device through the awning.

It is to be understood that while I have illustrated and described this fastener device as applicable to the art of awning supports, it is not confined to such field of usage, since it is readily applicable to perform similar functions in holding curtains of automobiles in place or in detachably retaining other objects together.

The invention consists of certain other novel features of construction and combinations of parts which will be hereinafter more fully described and pointed out in the appended claims.

Figure 1:
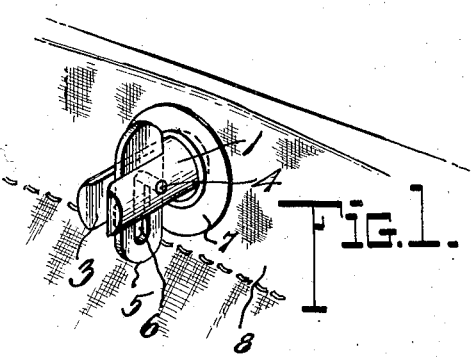
Fig. 1 is a perspective view of the preferred form of my invention, showing its operative application as an awning support.
Figure 2:
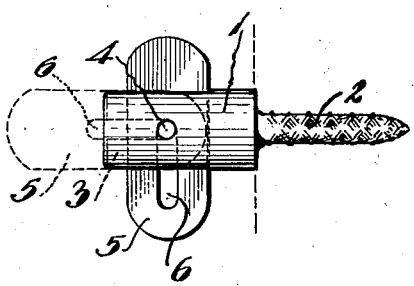
Figs. 2 and 3 are side and end views respectively of the form of the fastener shown in Fig. 1.
Figure 3:
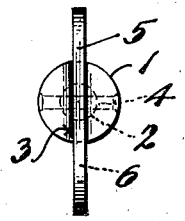

Referring to Figs. 1 to 3 of the drawing, the numeral 1 designates the body portion of the device which is provided at one end with a penetrating shank 2 designed to be driven into the wall of a building in position to receive the awning to be hung therefrom.

The other end of the body is formed with a cross slot 3 across which a pin 4 extends to receive a locking member or head 5. This head is slotted from a point substantially centrally thereof to a point adjacent one end, said slot being designated 6 and establishing a sliding and pivotal connection for the head enabling it to be shifted from release position shown in dotted lines in Fig. 2 to its latching position in full lines in said figure. The pin 4 is so positioned in the body 1 that the distance between it and the base of the slot 3 corresponds substantially to the distance from one edge of the slot 6 to the side of the head member 5, so that when the head in its transverse or vertical position shown in full lines one edge of the head sets against the base of the slot 3 and establishes a lock against accidental shifting about pin 4.

In the use of this form of fastener, when it is desired to apply or hang the awning in position, the operator merely presses against the bottom of the head and shifts the same vertically until the pin 4 abuts against the end of the slot 6, whereupon said head will swing about the pin to the horizontal position shown in dotted lines in Fig. 2, in which position said head is in alignment with the body 1 of the fastener device. The eyelet 7 of the awning 8 is then moved over the parts until it passes the inner end of the slot 3, when the head 5 may be swung about the pin 4 to assume its upper vertical position. From this position it will instantly drop by gravity to its lowermost vertical position as shown in Fig. 2 in full lines, locking the awning upon the fastener device. The freedom of movement of the head 5 on its pin and slot connection is quite advantageous in conjunction with its tendency to gravitate into its operative position because usually there is a necessary straining effort exercized in the hanging of an awning which requires that the operator employ both hands to sustain and position the awning upon the various fastener devices, a sufficient number of which are provided to sustain the whole width of the awning at its hanging edge.

Figure 4:
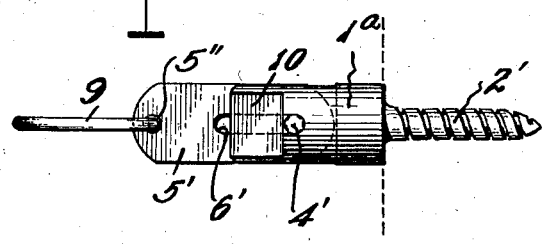
Fig. 4 is a side elevation of a modified form of the device in which a locking detent is employed, the parts being shown in the position assumed when inserting the fastener through an awning eyelet.
Figure 5:
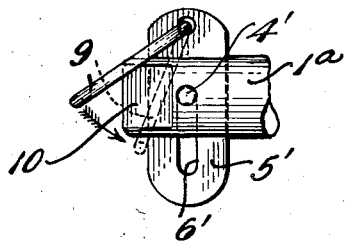
Fig. 5 is a view in side elevation showing the head member in locking position and the detent gravitating into interlocking engagement with the fastener body.
Figure 6:
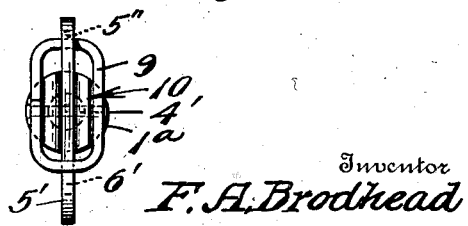
Fig. 6 is an end view of the fastener device shown in Fig. 5 with the parts in operative position.

Since it may occur that in the flapping of the awning due to wind pressure thereneath said awning may come in contact with the head 5 at its lower end and accidentally elevate it to its swinging position, I have provided a positive interlocking means whereby such accidental movement of the head is precluded. This supplemental form of the device is shown in Figs. 4 to 6. The locking means just referred to is in the form of an elongated loop or ring like detent designated 9 which is pivotally connected to the upper end of the head 5'. Said head at the upper end is provided with an aperture 5'' to accommodate this locking detent.

In this form of the device where the body portion 1a is cylindrical, the sides at the outer extremity of the body are grooved to provide the flat surfaces 10 so that in outer dimension the end of the body will conform substantially to the transverse diameter of the ring 9 which is adapted to engage with the flattened surfaces as will be hereinafter described. This form of the fastener is operated similarly so far as the head is concerned to that form shown in Figs. 1 to 3 excepting that the detent 9 forms a convenient manipulating means for shifting the head about its pin and slot connection to and from its operative position. By grasping the member 9 in the fingers the head may be shifted to its upper vertical position and then swung about the pin 4' into the position shown in Fig. 4 when the parts are aligned to readily receive the awning. The eyelet of the awning may now be slipped over the fastener device to its proper position whereupon the operator may swing the head to its upper vertical position transversely of the body and releasing the member 9 at this time allows not only the head itself to drop into its lower vertical position but also allows the detent 9 to gravitate into the position shown in dotted lines in Fig. 5 engaging about the end of the body. The head under such conditions cannot be shifted into release position because of the engagement of the end of the ring beneath the body. Manual release of the head is simply effected by swinging the ring outwardly over the end of the body, thereby enabling the head to be raised vertically until the pin 4' engages with the lower end of its slot 6'.

In this form of the device the penetrating shank 2' may be screw threaded and it is to be understood that I do not wish to be restricted as to the formation of this portion of the fastener device, since it depends upon the use to which the fastener is to be put as to whether the shank is constructed one way or another.

It is to be further understood that the fastener may be made of any desired material, but since it is designed as a permanent fastener it is preferable that the material be of a non-corrodible type, so as to prevent rust stains on the woodwork. Once the fasteners are applied it is unnecessary to use a ladder to remove or apply awnings. As the parts of the fastener are permanently connected together loss or misplacement of any of the parts is avoided.

I claim:

1. A fastener device of the class described, comprising a horizontal body having an attaching shank at one end and an open cross slot at its other end, a locking head member having a pin and slot connection with the body in the cross slot thereof, said head member having a thickness dimension less than the width between the inner side walls of the open cross slot, the slot in the head member extending longitudinally at one end thereof and being disposed to permit free swinging and sliding movement in the slot of the body when in unlocked position, the head member being adapted to depend from its pin connection when in said unlocked free swinging condition and shiftable into alignment with the body to permit insertion through an eyelet of an awning or the like to be hung on the fastener and then swingable about the pin connection to vertical position above the body to freely gravitate vertically into locking position transverse to the body, the inner edge of said head member when in the locking position cooperating with the closed side of the slot in the body to prevent swinging movement of the head member in said locked position.

2. A separable fastener device of the class described comprising a body having a fastening shank at one end thereof, a head member pivotally and slidably connected with the other end thereof and interlocking means shiftably connected to one of said members to interengage with the other for positively holding the head member against sliding movement and in a position transverse to the body.

3. A separable fastener device of the class described comprising a body having a fastening shank at one end, a head member pivotally and slidably connected with the other end thereof, and manipulating means shiftably connected to the head member for manually shifting the head member relatively to the body.

4. A separable fastener device of the class described comprising a body having a fastening shank at one end, a locking head member pivotally and slidably connected with the other end thereof, and locking means pivotally connected to the head member for manually shifting said head member to and from a locking position, said means constituting a locking detent for holding the head member to the body in one of its positions.

5. A separable fastener device of the class described comprising a body having a fastening shank at one end, a head member pivotally and slidably connected with the other end thereof, and a locking detent movably connected to the head member and arranged to gravitate into interlocking engagement with the body when said head member is turned into a position transverse to the body.

6. A separable fastener device of the class described comprising a body having a fastening shank at one end, a head member pivotally and slidably connected with the other end thereof, and a locking ring pivotally connected to the head for manually shifting said head member to a position transverse to the body and inter-lockingly engageable therewith, said head member and ring each being constructed and arranged to drop into locking position when released in the said transverse position of the head member.

7. A separable fastener device of the class described comprising a body having a fastening shank at one end, a head member pivotally and slidably connected with the other end thereof, the body having a flattened side at its free end, and an elongated ring connected to one end of the head member and adapted to swing into interlocking engagement with the flattened portion of the body when the head member is disposed in a position transverse to said body.

FRANK A. BRODHEAD.